March 22, 1932.    L. A. GRIMES    1,850,391
SEALING RING
Filed Aug. 14, 1930
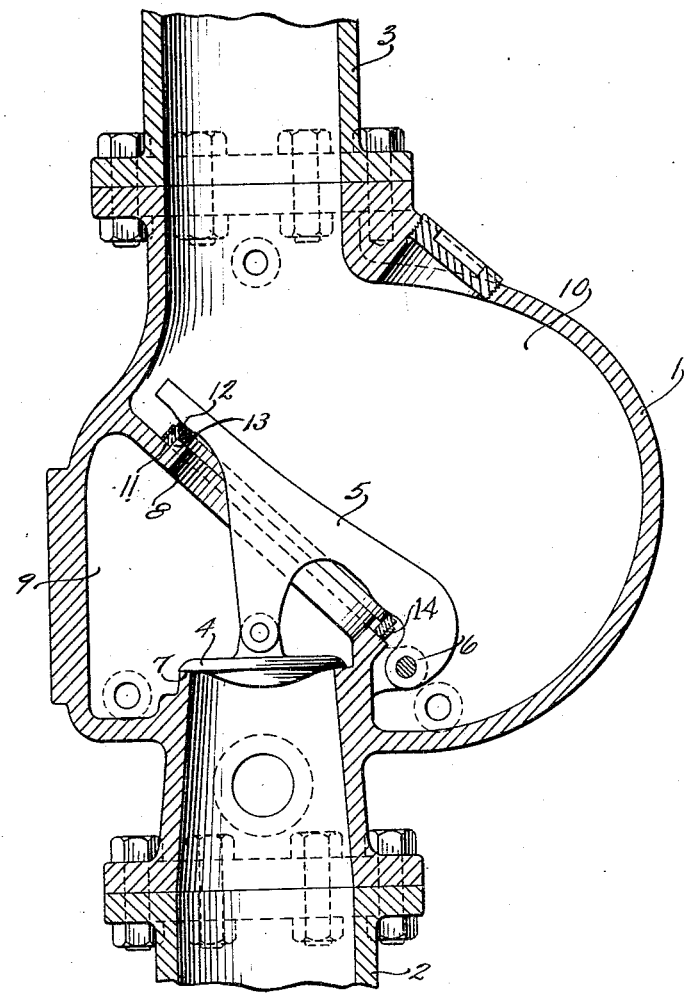
INVENTOR
Lester A. Grimes.
BY
Bartlett, Eyre, Scott & Keel
ATTORNEY Patented Mar. 22, 1932

1,850,391

UNITED STATES PATENT OFFICE

LESTER A. GRIMES, OF MONTCLAIR, NEW JERSEY, ASSIGNOR TO GRIMES SPRINKLER COMPANY, INC., OF NEWARK, NEW JERSEY, A CORPORATION OF NEW JERSEY

SEALING RING

Application filed August 14, 1930. Serial No. 475,318.

The present invention relates to an improved sealing ring for valves which insures tight seating of the valve at all times and which is simple and economical of construction. The improved sealing ring is particularly suitable for use in dry pipe valves as it permits of the elimination of the priming water heretofore found essential for these valves and the attendant servicing thereof.

Valve sealing means heretofore in common use comprise a ring of tin or Babbitt metal set into a groove in the fixed part of the valve structure to form the seat for the clapper and a flat annular rubber gasket fastened to the clapper, as by a metal clamping ring, adapted to engage the metal seat upon a closure of the valve. This arrangement has the disadvantage that the rubber gasket is apt to curl up at the edges thereof away from the seat, with the result that the seal shortly becomes ineffective and leakage occurs through the valve. The improved sealing ring of the present invention replaces the tin or Babbitt sealing ring of the prior art by a ring of rubber which may be set into the fixed part of the valve structure or, if desired, into the clapper of the valve; eliminating entirely the usual rubber gasket. The rubber ring, having a thickness or depth greater than the annular width thereof, has no tendency to curl or warp and insures at all times such a tight seal between the valve parts that there is no necessity for the provision of priming water. When the improved ring is set into the clapper it is advisable to tin the surface of the cast iron seat to insure a good seal. When the ring forms the seat, however, it is not necessary to tin that part of the clapper with which the ring engages when the valve is closed, because clappers of dry pipe valves are ordinarily made of bronze which metal will form a sufficiently tight seal with the rubber ring. If desired, of course, as a matter of additional precaution, and to prevent possible sticking, the contacting surface of the clapper may be tinned.

For a better understanding of the invention reference may be had to the accompanying drawing in which is illustrated a dry pipe valve provided with the improved sealing ring of the invention.

In the drawing, the casing 1 encloses the dry pipe valve normally preventing the flow of water from the main 2 into the sprinkler system 3. The particular valve illustrated comprises the water and air clappers 4 and 5 connected together for rotation about a common pivot 6 and cooperating respectively with the seats 7 and 8. The clapper 4 has a smaller surface than the clapper 5 and is exposed on its under side to the pressure of the water in the main 2. The larger air clapper 5 is exposed on its upper surface to the pressure of the air in the sprinkler system 3 which serves, because of the greater surface of the air clapper, to hold the clappers closed. Chamber 9 intermediate the clappers is at atmospheric pressure and is normally provided with a suitable drip valve, not shown, for the drainage of water therefrom. It will be apparent that it is of prime importance to maintain a tight seal at the air clapper to prevent reduction of the sprinkler system pressure by leakage about this clapper but that a slight leakage past the water clapper, is relatively unimportant.

Ordinarily, priming water is maintained in the chamber 10 above the air clapper to form an additional water seal for the system pressure. Frequent inspection is necessary to insure the continual presence of the priming water. According to the present invention, the presence of priming water is made unnecessary as a tight seal at all times is effected, for example, by forming the seat 8 with a shoulder 13 against which a rubber ring 12 having a depth greater than the height of the shoulder is held in contact by a metal clamping ring 14. The rubber ring 12 protrudes beyond the shoulder 13 and ring 14 so as to engage the under surface of the clapper 5 when seated. The rubber ring 12, being of the shape of a short length of tubing, has no tendency to warp or curl away from the engaging surface.

Although the new sealing ring has been described and illustrated in connection with the preferred use thereof in dry pipe valves, obviously the invention is not limited to such application but may be advantageously employed whenever an efficient seal is required. As mentioned heretofore, the ring need not necessarily be carried by the fixed part of the valve structure, but, if desired, may be supported by the movable clapper thereof.

The following is claimed:

1. In a valve having a fixed member surrounding an opening and a cooperating clapper, a shoulder on said fixed member, a rubber ring adapted to encircle said shoulder and to protrude thereover to form a seat for said clapper and a clamping ring about said rubber ring to hold the same in engagement with said shoulder.

2. In a valve having a fixed member surrounding an opening and a cooperating clapper member, a shoulder on one of said members, a rubber ring adapted to encircle said shoulder and to protrude thereover so as to engage the other member when the valve is closed, and a clamping ring about said rubber ring to hold the same in engagement with said shoulder.

In testimony whereof, I have signed my name to this specification.

LESTER A. GRIMES.